W. B. HAYNES.
GASKET.
APPLICATION FILED NOV. 15, 1911.
1,050,132.
Patented Jan. 14, 1913.
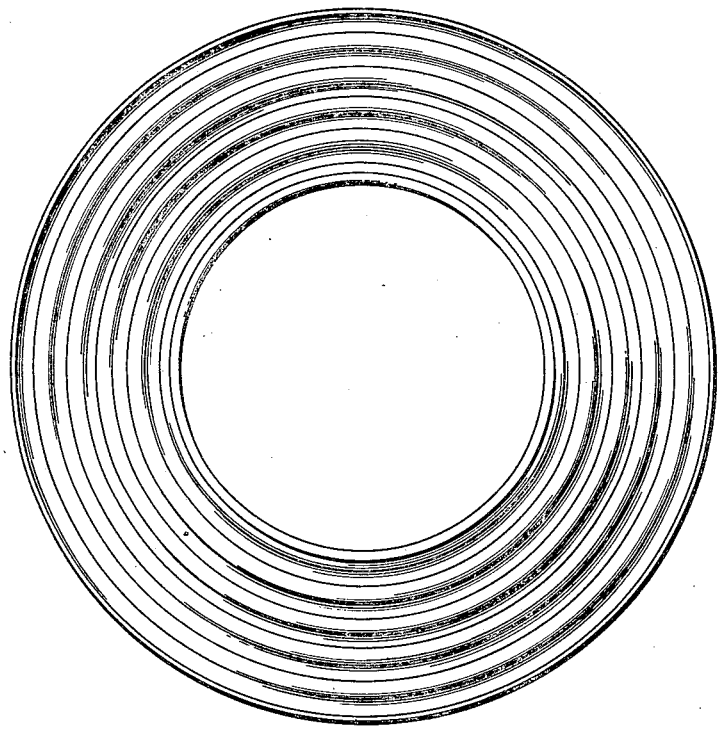
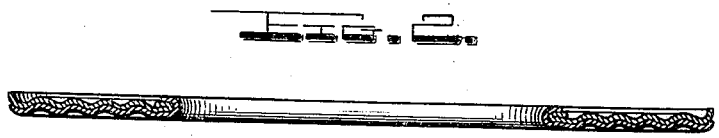
Witnesses
Inventor
William B. Haynes,
By James W. Bevans
Attorney

UNITED STATES PATENT OFFICE.

WILLIAM B. HAYNES, OF AKRON, OHIO.

GASKET.

1,050,132.  Specification of Letters Patent.  Patented Jan. 14, 1913.

Application filed November 15, 1911. Serial No. 660,401.

*To all whom it may concern:*

Be it known that I, WILLIAM B. HAYNES, a citizen of the United States, residing at Akron, in the county of Summit and State of Ohio, have invented new and useful Improvements in Gaskets, of which the following is a specification.

This invention relates to improvements in gaskets for use on cylinder heads, pipe joints, etc., and the object is to provide a duplex, metallic gasket, the two parts of which will be securely held together so as not to separate when the parts between which it is used are bolted together, and which will form a tight joint.

In the drawing, Figure 1 is a face view of a gasket constructed in accordance with my invention, and Fig. 2, a similar view showing a modified structure.

Referring now more particularly to the drawing, it will be seen that the improved gasket consists of two circular parts or plates 1, formed of metal, preferably copper, having the central opening 2. Each plate is formed with a series of concentric corrugations which decrease in depth from the outer to the inner circumference. The metal of both plates at the central opening is turned over upon one face of the gasket as at 4 and projects in a direction outward toward its outer periphery thereby increasing the thickness of said gasket at its inner periphery.

A gasket formed with uniform corrugations is weakened on the inner edge as when the two parts between which the gasket is placed are brought together, the corrugations are drawn from the metal at this point as the metal cannot creep from the outer edge. My improved gasket has the deep corrugations on the outer edge where the metal can creep in from this edge toward the inner edge. This produces a gasket which is not weakened at its inner edge. However, this alone would not make a thoroughly effective gasket for the reason that a flange joint presses tightest at the bolt circle and therefore the corrugations are lessened in usefulness toward the inner edge of the gasket and at the inner periphery where the steam pressure is greatest and the flanges pinch the least they are scarcely operative at all. But by providing a gasket of two corrugated plates with the corrugations deeper at the outer periphery and with a lap joint at the inner edge, I have produced a gasket having a bearing on the flanges both at the inner edge where the steam pressure is the greatest and the flanges pinch the least and also at the outer edges where the flanges grip tightly and the steam pressure is the least. Further the gasket as thus constructed will gasket the threads and keep the steam from leaking at that point.

Having thus fully described my invention, what I claim as new and desire to secure by Letters Patent of the United States, is—

A gasket composed of two metal plates having a central opening and having the metal of both plates at said opening turned over upon one face of the gasket and projecting in a direction outward toward its outer periphery, thereby increasing the thickness of said gasket at its inner periphery.

In testimony whereof, I affix my signature in the presence of two witnesses.

WILLIAM B. HAYNES.

Witnesses:
 HARRY G. REAVE,
 C. G. ROETZEL.